United States Patent
Huffstetter

[15] 3,672,074
[45] June 27, 1972

[54] REMEDIAL READING TEACHING DEVICE

[72] Inventor: Jean M. Huffstetter, 1753 Willowside Road, Santa Rosa, Calif. 95401

[22] Filed: July 23, 1970

[21] Appl. No.: 57,538

[52] U.S. Cl. ..............................................35/35 H
[51] Int. Cl. ......................................G09b 17/00
[58] Field of Search........................35/35 R, 35 H, 73, 75, 76

[56] References Cited

UNITED STATES PATENTS

| 1,479,423 | 1/1924 | Barton | 35/73 |
| 2,929,160 | 3/1960 | Lyttle | 35/73 |

OTHER PUBLICATIONS

"Scrollmaster" Advertisement, 1965........................35/76

Primary Examiner—Wm. H. Grieb
Attorney—Julian Caplan

[57] ABSTRACT

To train students having problems in reading to move the eyes from left to right of an entire line of reading matter and then to move the eyes from the right end of one line to the left end of the next line, a mechanical teaching device is provided. The front face of the device has vertically spaced apart parallel (horizontal) holders into which cards displaying reading material may be inserted. Below each holder is a slot parallel to the holder, and the right end of the top slot is connected by a diagonal slot to the left end of a slot below the next holder, each parallel slot being connected to the next lowermost by a diagonal slot. A pointer is inserted in a hole at the left end or beginning of the top slot and may be removed only from the right end or finish of the bottom slot. Springs may be positioned at intervals in the slots to prevent the pointer from moving backward and assuring that the reader's eyes follow through in proper reading procedure from beginning to end.

9 Claims, 3 Drawing Figures

INVENTOR.
JEAN M. HUFFSTETTER
BY Julian Caplan
ATTORNEY

REMEDIAL READING TEACHING DEVICE

The principal purpose of the present invention is to provide a device which trains retarded readers in following normal reading procedures. Some readers do not follow lines from left to right but stop part way across a page or column. Others do not move the eyes from the right end of one line to the left end of the next lower line. Other deficient readers have problems caused by skipping lines, by retracing normal reading paths and by lack of attention in following through from beginning to end. The present device is an aid in overcoming these and other tendencies of students having remedial reading problems.

Another feature of the invention is the fact that the device operates in a manner similar to a game, offering to the user certain rewards which encourage attention and application to the remedial reading problems. Thus a series of springs in the device are contacted by a pointer, one after the other, when the user follows the correct pattern. The sound of flexing and releasing such springs has a pleasant tone which serves to encourage the reader to proceed from spring to spring or, in other words, from word to word.

Another feature is the use of a pointer which the user grips and which can only be removed after the complete pattern of words has been properly traversed. The pointer may be provided with a rattle or other sound-making device which makes it attractive to the user to complete the normal reading pattern.

Another feature of the invention is the fact that springs are located in the normal path of reading in such fashion that it is impossible for the reader to reverse normal direction, and the reader must proceed from beginning to end in normal fashion in order to remove the pointer at the end of the last line of the reading matter.

Still a further feature of the invention is the fact that the device is relatively easily portable and inexpensive so that each student may be provided with a device which he holds close at hand and thus substantially individual instruction is afforded to each classroom student.

Another feature of the invention is the fact that the reading matter may be changed frequently with very little effort or preparation. The device holds a plurality of cards on which written matter is displayed, there being one card for each line. These cards may be pre-printed or blank cards may be provided upon which the teacher writes words. This feature also enhances the use of the device for individual instruction dependent upon the reading problems of each individual student.

Another optional feature of the invention is the optional provision of one spring at the end of each word. Thus the reader associates the completion of the reading of a word with the sound which is made when the pointer passes each of the springs. As a further optional feature, the tone of each spring may vary so that in completing the reading of eight consecutive words a complete scale may be sounded by using springs which have the tones of the scale or, alternatively, the tones may be such as to play a tune when the complete sequence is traversed.

Further optional features of the invention include the provision of a hook by which the device may be suspended from a wall or an easel similar to a picture-frame easel, so that the device may be supported upright on a desk.

Other objects of the present invention will become apparent upon reading the following specification and referring to the accompanying drawings in which similar characters of reference represent corresponding parts in each of the several views.

Figures 1, 2:
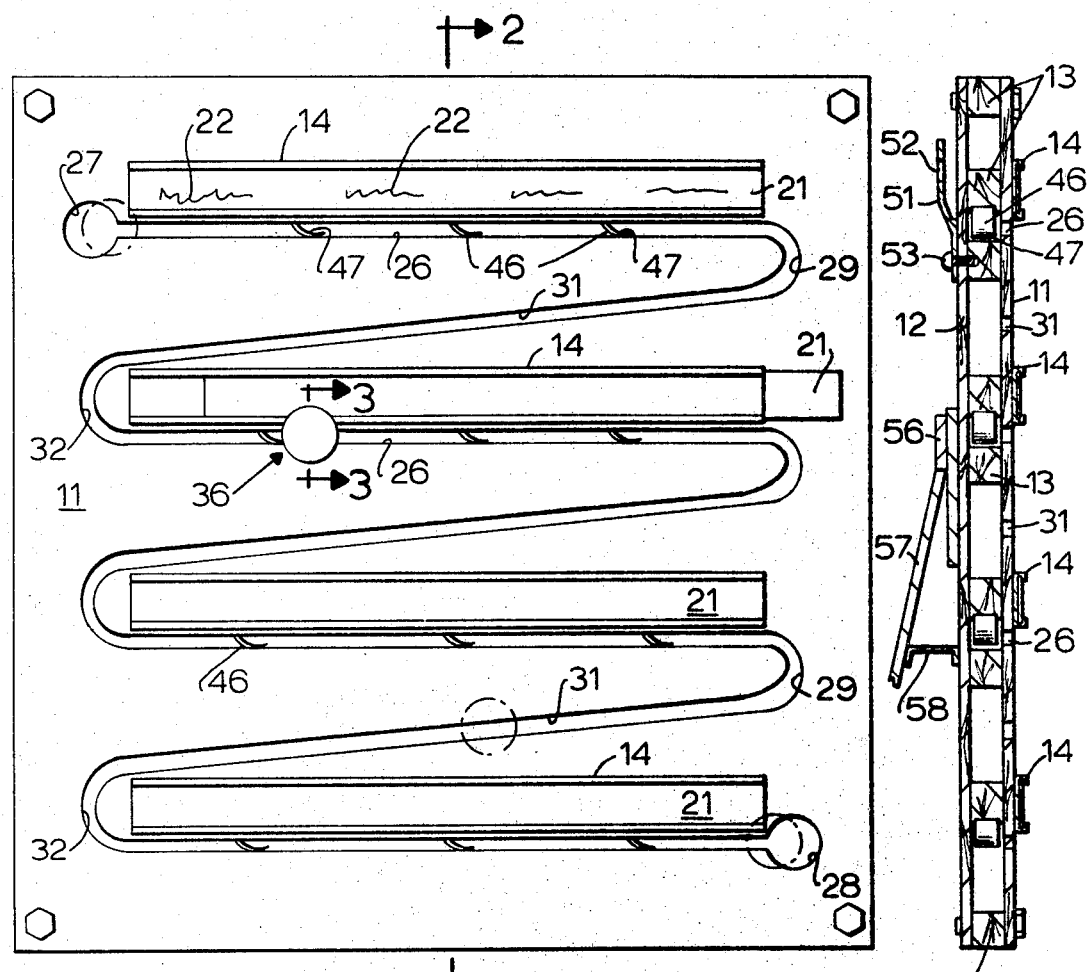
FIG. 1 is a top plan view of the device.
FIG. 2 is a sectional view taken substantially along the line 2—2 of Fig. 1.
Figure 3:
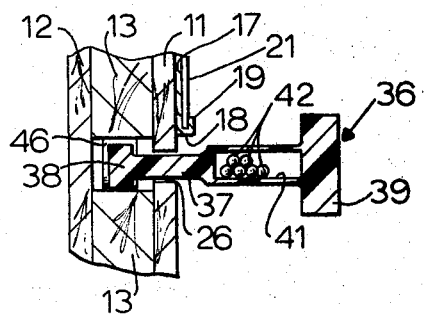
FIG. 3 is a fragmentary enlarged sectional view taken substantially along the line 3—3 of Fig. 1.

In one form of the device herein illustrated, a front 11 and back 12 are held spaced apart by spacers 13, which spacers also preferably underlie the grooves hereinafter explained and confine the path of the pointer 36 in association with said grooves. Although the device is shown formed of a back and front face and separate spacers, it will be understood that the board may be formed in other manners to accomplish the confinement of the pointer 36 to a desired path and a display of words along horizontal stretches of said path. One form of holder 14 for the display of reading matter is a channel having a back 17 affixed to the front panel 11, shallow top and bottom edges 18 and inward turned lips 19 along each edge 18. The spacing between edges 18 accommodates the width of cards 21 on which words 22 are displayed at spaced intervals. In the accompanying drawings, there are four holders 14 shown each vertically spaced from the other in parallel horizontal stretches. The cards 21 may be slipped into and out of the holders 14 to change the wording 22 as desired. Preferably the composite of the words 22 on each of the four cards 21 comprises a sentence, verse or paragraph.

Underneath each holder 14 is a horizontal slot 26 which runs left to right beneath the holder. At the lefthand end of the top slot 26 is an enlarged hole 27, and it will be understood that the spacing material 13 underlying the panel 11 at such location is suitably cut away to provide access to the space between panels 11 and 12 through hole 27. At the right-hand end of the lowermost slot 26 is a similar enlarged hole 28. As hereinafter explained, pointer 26 is installed in the hole 27 and removed from the hole 28 after the entire reading matter on the cards 21 has been traversed.

At the righthand end of each slot 26, except the lowermost slot, is a curved slot 29, the degree of curvature being slightly less than 360°. Extending downward to the left of the terminus of slot 29 is a diagonal slot 31 which terminates immediately above the lefthand end of the next lowermost horizontal holder 14. A second curved slot 32 connects the lower end of diagonal slot 31 with the righthand end of next lowermost horizontal slot 26. Curved slots 29 are located at the righthand end of all but the lowermost slot 26, and curved slots 32 are located at the lefthand end of all but the topmost slot 26.

Pointer 36 and a stem 37 which fits into slot 26, 29 or 32. The inner end of stem 37 is formed with an enlargement 38 which is larger than the width of slot 26. The outer end of stem 37 may be provided with a handle 39 of a size to be conveniently gripped by the user. The holder optionally may be formed with a cavity 41 in which shot 42 is located. Thus when the user shakes the pointer 36, a rattle is produced, a feature which is pleasing to young children and retarded children. The use of such a rattle makes it attractive to the child to complete the reading path since only after the path is completed may the pointer 36 be removed and the rattle sounded.

At intervals along each of the horizontal slots 26 is a flat leaf spring 46, which preferably is secured by any convenient means to the underside of one of the spacers 13 and extends downwardly and to the right immediately beneath each slot 26. A curved lowered tip 47 is preferably formed on the lower end of each spring 46. The function of springs 46 is to ensure that the pointer 36 may only be moved from left to right in each of the slots 26. The downward inclination of the springs 46 and the curved tip 47 prevents movement from right to left for any considerable distance. It may be that each spring 46 is associated with a word 22, being located at the end of such word. Thus as the user passes each word, a sound is emitted from a spring 46. As has previously been stated, the sounds may be in intervals conforming to a scale or may be of tones which combine to form a tune as the user progresses from one end of the written matter to the other.

To facilitate the display of the device, various means may be employed. Thus, as shown in Fig. 2, there may be a hook forming member 51 having a hole 52 at its upper end and held in place by a fastener 53 which fits into one of the spaces 13. In such manner the device may be suspended from a wall. Alternatively, or as a supplement, an easel base 56 may be secured to the back 12 having hinged thereto an easel spreading portion 57 which is shown only partially but which is of a length to extend out to a supporting surface. A flexible strap 58 fastened to spreading portion 57 and to back 12 limits the outward extension of portion 57.

In use of the device, the teacher installs cards 21 in the various holders 14, each card having a word 22, syllable, letter or whatever reading matter is chosen. Such matter may be changed from time to time. The user is taught to install the pointer 36 in the first hole 27. The enlargement 38 will fit through a hole 27 but cannot be removed through one of the slots 26, 29 or 32. Because of the location and slanting of the springs 46, the pointer 36, after the user has once started on the path from left to right in the slot 26 below the first holder 14 cannot reverse direction. Thus, the pointer 36 must be brought across from left to right of the words 22 on the first holder 14. Thereupon the user may traverse the curve 29 and the slanted line 13 which carries the eyes down from the right-hand end of the top line to the left-hand end of the next line. The pointer 36 must be moved in the conventional reading pattern from the left-hand end of the top line to the right-hand end of the bottom line whereupon it may be removed through the hole 28. Thus proper reading habits are encouraged and taught by use of the present device.

What is claimed is:

1. A remedial reading teaching device comprising a frame, a plurality of holding means in parallel rows on said frame, each said holding means adapted to hold reading matter, said frame formed with a plurality of first grooves, one said first groove below each said holding means and said frame formed with a plurality of second grooves extending from the right-hand end of a first groove to the left-hand end of the next lowermost first groove, and a pointer having a shank dimensioned to slide along said first and second grooves and to be held in the hand of the user and an enlarged end within said frame to prevent unintentional removal of said pointer from said frame.

2. A device according to claim 1 which further comprises a plurality of spring means disposed at intervals in said first grooves, said spring means positioned and shaped to permit movement of said pointer from left to right and to restrain movement of said pointer from right to left.

3. A device according to claim 2 in which said spring means when flexed emit differing musical notes.

4. A device according to claim 2 which further comprises a plurality of words on said holding means for each said spring means.

5. A device according to claim 2 in which each spring means comprises a flat spring fixed to the top of a first groove and slanting down and toward the right in said first groove.

6. A device according to claim 1 in which each said groove is wider below the surface of said frame than at said surface, said frame formed with a first enlargement at the left end of the topmost first groove to accept said enlarged end of said pointer and a second enlargement at the right end of the bottom-most first groove to permit withdrawal of said enlarged end, whereby said pointer can only be removed from said grooves after it has traversed all of said first and second grooves, commencing at said first enlargement and ending at said second enlargement.

7. A device according to claim 6 in which said pointer is formed with a cavity and which further comprises sounding means in said cavity.

8. A device according to claim 1 in which said holding means comprises in cross-section a shallow channel with in-turned lips shaped to receive narrow cards slid end-wise of said channel.

9. A device according to claim 1 in which said frame comprises a top, formed with slots aligned with said grooves, a bottom, and spacers between said top and bottom along the edges of said grooves.

* * * * *